Aug. 27, 1968  J. W. HICKS, JR  3,398,669
IMAGE-COPYING APPARATUS AND METHOD
Original Filed June 27, 1961                      2 Sheets-Sheet 1
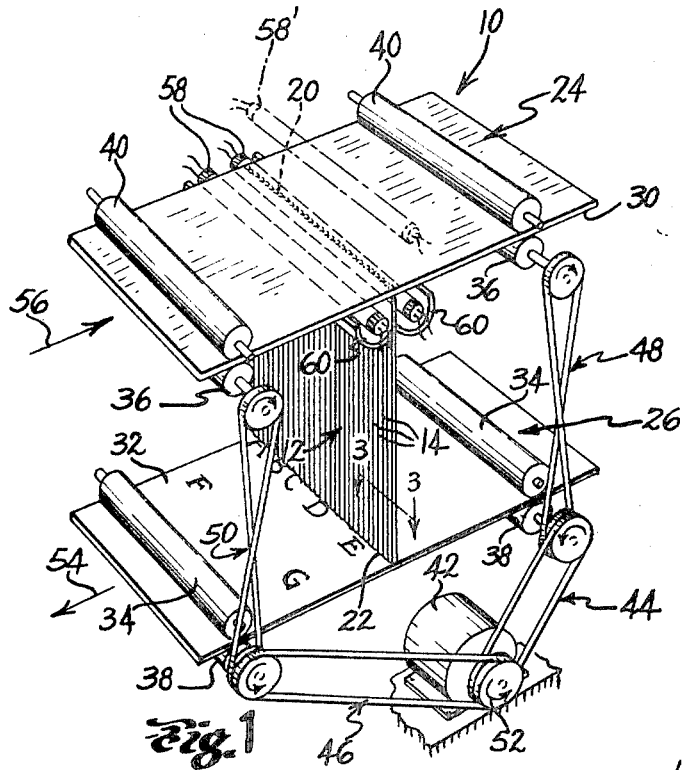
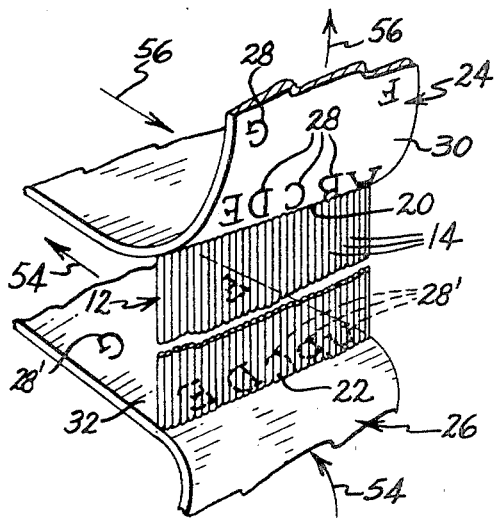
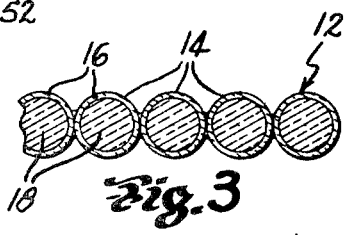
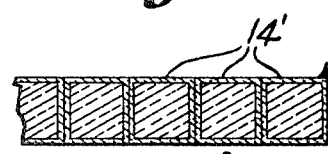
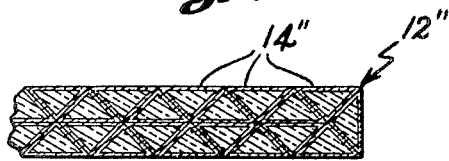
INVENTOR
JOHN W. HICKS, JR.
BY Louis L. Gagnon
ATTORNEY Aug. 27, 1968     J. W. HICKS, JR     3,398,669
IMAGE-COPYING APPARATUS AND METHOD
Original Filed June 27, 1961     2 Sheets-Sheet 2
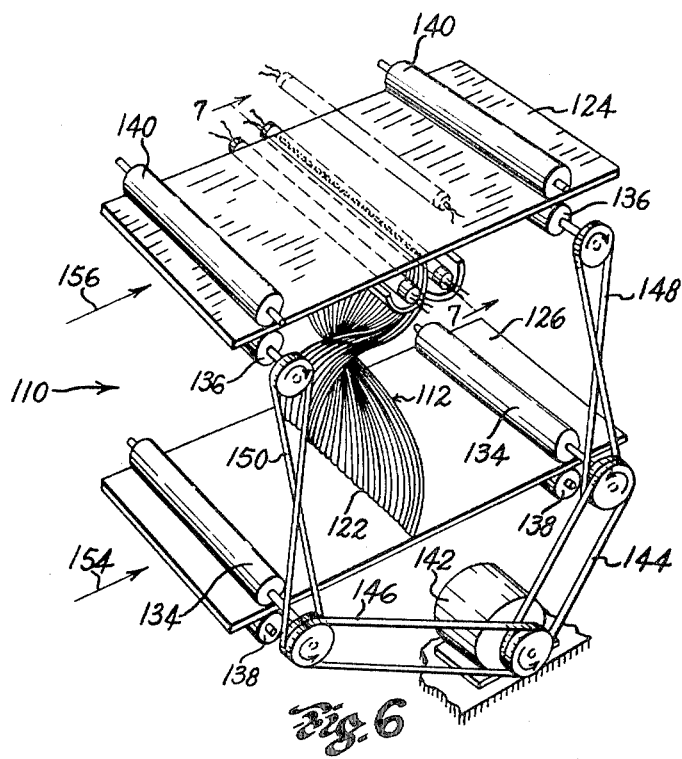
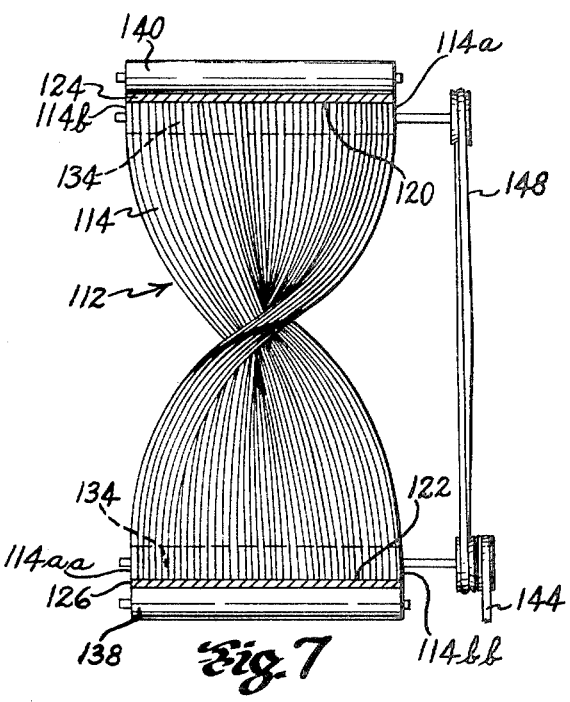
INVENTOR
JOHN W. HICKS, JR.
BY
Louis L. Gagnon
ATTORNEY

3,398,669
IMAGE-COPYING APPARATUS AND METHOD
John W. Hicks, Jr., Fiskdale, Mass., assignor, by mesne assignments, to American Optical Corporation, a corporation of Delaware
Continuation of application Ser. No. 159,198, June 27, 1961. This application Sept. 16, 1964, Ser. No. 398,153
2 Claims. (Cl. 95—73)

This invention relates to an image-copying technique and apparatus therefor and has particular reference to novel means and method for producing accurate reproductions of original subject matter such as photographic, printed or written material or the like.

This application is a continuation of my copending application Ser. No. 159,198 now abandoned, filed June 27, 1961.

Image-copying procedures have been handicapped heretofore by the reversal of image inherent in contact printing or other face-to-face copying operations. Mirror images of original subject matter resulting from conventional face-to-face copying procedures have, previous to this invention, been rectified to produce true copies by the employment of various types of relatively complicated and expensive equipment involving the use of optical image reversal systems or the use of intermediate so-called photosensitive negatives which receive the mirror images of original subject matter to be copied and, by contact or other means of exposure to the copy material, are used to transfer the mirror image in true form upon the copy.

True copies of subject matter printed or otherwise provided on one side only of an original consisting of relatively thin transparent or translucent sheet material can be produced by placing the opposite side of said original against a photosensitive copy sheet and exposing said copy sheet by directing light thereonto through the original. This process has a limited application of use since originals on relatively opaque material and those having subject matter on both sides thereof cannot be copied by the above printing method.

In view of the fact that a face-to-face copying technique is universally adaptable to substantially all job requirements, the present invention relates primarily to improvements in apparatus and method of this nature.

Accordingly, it is a principal object of the present invention to provide simple, highly efficient and economically attractvie means and method for making true copies of original printed or similarly rendered subject matter.

Another object is to accomplish the above by a face-to-face copying technique wherein the original subject matter to be copied is imaged directly onto the receiving face of the intended copy.

Another object is to provide novel means and method for producing a true rendition of the original subjec matter upon the copy thereof by causing a reversal of the image of the original subject matter simultaneously as it is transferred to the copy.

A further object is to effect said reversal of image by providing for a line scanning of the original subject matter in one direction at a controlled rate progressively from one end to the other thereof to convert said subject matter into a continuous succession of projected line images and transferring the resultant succession of line images in continuous sequence upon the receiving face of a copy sheet while moving said copy sheet in a direction opposite to that of said direction of scanning and at a substantially equal rate to cause said copy sheet to continuously receive said line image successively, one after another, in a reverse order of progression to that of their production by the action of said scanning.

Another object is to provide fiber optical light-conducting means for forming and transferring said line images from the original subject matter to the intended copy thereof.

A still further object of the invention is to provide method and apparatus of the above character which offers the distinct advantage of true image reproduction in face-tof-face copying by direct transfer of image from original subject matter to a single copy sheet with dependable accuracy of reproduction through the use of simple, inexpensive and substantially trouble-free apparatus.

Other objects and advantages of the invention will become apparent from the following description when taken in conjunction with the accompanying drawings in which:

FIG. 1 is a diagrammatic illustration, in perspective, of a preferred embodiment of the invention;

FIG. 2 is a fragmentary perspective view of certain of the major components of the device shown in FIG. 1 which diagrammatically illustrates the function of said device;

FIG. 3 is a fragmentary cross-sectional view of a part of the device taken on line 3—3 of FIG. 1;

FIGS. 4 and 5 are views similar to FIG. 3 illustrating modified forms of said part of the device;

FIG. 6 is a diagrammatic illustration, in perspective, of a modified embodiment of the invention; and FIG. 7 is a diagrammatic sectional view taken substantially upon section line 7—7 of FIG. 6 and looking in the direction of the arrows.

Referring more particularly to the drawings wherein like characters of reference designate like parts throughout the various views, there is shown in FIG. 1 an image-copying device 10 which, in diagrammatic fashion, illustrates the general concept of the invention.

The device 10 comprises a ribbon-like image transfer member 12 formed of a plurality of individual light-conducting fibers 14 in side-by-side preferably connected relation with each other as shown more clearly in FIG. 3. The fibers 14 may be formed of various known light-conducting materials among which, optical glass has been found to be preferable primarily because of its high degree of efficiency in conducting light.

The fibers 14 of the member 12 which are used to convey images of individual elements of subject matter such as photographs or writing or the like from one location to another, as will be described in detail hereinafter, are light-insulated from each other by individual outer claddings 16 which surround their respective light-conducting core parts 18 (see FIG. 3). This prevents the effects of "crosstalk" or the interaction of light passing from one adjacent fiber into the other and assures that each image component which is conveyed through a particular fiber of the member 12 will be contained within that fiber throughout its length and emitted at the exit end of the member 12 in accurate geometrical relation with other image elements transmitted simultaneously through the other fibers of the member 12. That is, substantially no intermixing of image elements between fibers will take place and the sum total of the image elements transferred by the member 12 will produce a composite line-like image of high quality definition, the composite line-like image being the result of the ribbon-like or side-by-side arrangement of the fibers 14 (see FIG. 3).

A highly optically efficient image transfer member 12 would embody, for example, fibers 14 each having a core part 18 formed of optical glass having a relatively high index of refraction with a thin outer cladding therearound of material having a relatively low index of refraction for light-insulating purposes. Claddings of a thickness equal to or less than one-tenth the overall diameter of the fibers are generally considered suitable for this purpose and a typical fiber 14 might, for example, comprise a core part 18 formed of optical flint glass having an index of refraction of approximately 1.69 with a cladding of crown or soda-lime glass having an index of refraction of approximately 1.52.

The fibers 14 of the member 12 are optically finished at their opposite ends to be rendered readily receptive to light entering or emitting therefrom and are preferably fused or otherwise connected together in side-by-side relation so as to form, as a group, an elongated slit-like light-receiving face 20 at one end of the member 12 and a light-emitting face 22 of similar configuration at the opposite end of the member 12 (see FIGS. 1 and 2).

While, as mentioned above, fusion is preferable for securing the fibers 14 together, certain relatively tight-fitting clamps or supporting members may be used or the fibers may be cemented together with any one of many well-known glass cements or epoxy resins or the like.

The member 12 which, as stated above, provides means for effectively transferring an elongated slit-like or line image from its face 20 to its face 22 is placed in the device 10 vertically, as shown for purposes of illustration (see FIGS. 1 and 2), so as to be in substantially normal relation to a pair of sheet-like members 24 and 26 from one of which, image information is to be transferred by the member 12 and duplicated upon the other.

The member 24 will hereinafter be considered to be the article containing subject matter such as a photograph, printed or written matter or the like to be copied and will be referred to in the following description as "the original 24." In like manner, the member 26 will be hereinafter considered to be the article upon which the subject matter is to be reproduced and in the following description will be referred to as "the copy 26."

In any event, the original 24 will be considered, for purposes of illustration, to have subject matter in the form of lettering 28 in true readable form upon its underside 30 which is to be duplicated in the same true readable form upon the surface 32 of the copy 26. The surface 32 of the copy 26, is, as in the case of all image-copying devices, a light-sensitive surface which, when exposed to image-forming light and subsequently developed, will produce a copy of the image projected thereon. Photosensitive surfaces of silver emulsion or various other compositions are well known to the art and their development either by immersion in a suitable liquid developer or by exposure to ammonia or other gases or vapors is common practice and does not constitute a part of this invention. Therefore, while the surface 32 of the copy 26 might ordinarily require treatment following its exposure to image-forming light to render the resultant incident image visible, the images produced by the device 10 upon surface 32 of the copy 26 will be, for purposes of illustration, shown and described hereinafter as becoming immediately visible upon exposure of the surface 32 to the image-forming light. That is, on the copy 26 in FIGS. 1 and 2, lettering has been shown to indicate that a part of the copy has been so exposed as to duplicate the lettering 28 on the original 24.

Referring now to the operation of the device 10, it can be seen from FIG. 1 that both the original 24 and the copy 26 are passed directly over their respective adjacent end faces 20 and 22 of the member 12 with no more than a minimum of clearance therebetween which is sufficient to prevent possible marking or damaging of the surfaces 30 and 32.

The original 24 and copy 26, with their surfaces 30 and 32 in facing relation to each other, are moved along parallel paths but in opposite directions at equal rates for purposes of reversing the image received on the surface 32 to provide a true copy of the original as will be described in detail shortly. This movement of the original 24 and copy 26 is accomplished by means of drive rollers 38 engaging the copy and drive rollers 36 engaging the original which are held in firm driving relation therewith by the adjacent respective pressure rollers 34 and 40 placed against the opposed sides of the respective copy 26 and original 24. The pressure rollers may be spring-biased or otherwise arranged in the fashion of a wringer-type arrangement to provide the drive rollers with a suitable gripping action which will also function to pick up and carry new sheets of original and copy material across the faces of the member 12 as they are fed into the device 10.

An electric motor 42 or the like is provided to drive the rollers 38 and 36 through conventional belt and pulley drives 44 and 46 extending from the motor 42 to the rollers 38 and similar belt and pulley drives 48 and 50 extending from the rollers 38 to the rollers 36. The belts and pulleys are arranged as illustrated (FIG. 1) so as to cause the original 24 to be moved in a direction opposite to that of the copy 26. By uniform standardization of the pulley diameters, the original 24 and copy 26 will move at equal rates and in opposite directions when the motor 42 is actuated. Thus, it can be seen that by a counterclockwise rotation of the motor drive pulley 52, the copy 26 will be driven in the direction indicated by arrow 54 and the original 24 will be simultaneously driven oppositely in direction as indicated by the arrow 56.

In order to illuminate the subject matter or lettering 28 on the surface 30 of the original 24 which lettering is to be imaged by the member 12 upon the copy 26, a pair of elongated lamps 58 are provided, one at each side of the member 12, adjacent the surface 30 of the original 24. Light from the lamps 58, in passing into the material of the original 24 adjacent the face 20 of the member 12 and simultaneously in between the ends of the fibers 14 and the surface 30, will illuminate, for example, the lettered area of the surface 30 adjacent the face 20 of the member 12. The lamps 58 may be conventional fluorescent tubes or the like which are characterized to emit white light, ultra-violet light or other types of light in accordance with the characteristics of the particular type of sensitive surface 32 used on the copy 26.

Stray light from the lamps 58 is shielded from the sensitive surface 32 by cover members 60, and, of course, other shielding may be used where needed to prevent stray light from the light sources 58 from reaching and fogging the light-sensitive surface 32.

It can be seen that the image-receiving face 20 of the member 12 which extends transversely across the original 24 forms, in effect, a line-like light-receiving entrance area which is caused to scan the lettering 28 when the original 24 is moved across the said face 20. This effect of line scanning then results in the breaking up of the original subject matter of lettering 28 into individual line-like elements which are imaged through the member 12 progressively and successively as the original 24 is moved from one end to the other of the area of lettering 28. This succession of line-like image elements of the lettering 28 is received at the face 22 of the member 12 to expose the sensitive surface 32 of the copy 26, which, in moving at the same rate as the original 24, receives the succession of line-like images in continuous progressive manner. In this manner, a reproduction of the subject matter or lettering 28 on the original is produced upon the copy 26 by the reaction of the sensitive surface 32 to the image-forming light emitted by the member 12.

Ordinarily, in face-to-face copying, a mirror image of the lettering 28 would be produced upon the copy 26. This, of course, would be true in the present case if both the original and copy were moved in the same direction. However, since the copy is moved in an opposite direction as shown and described above, a true copy 28' of the original lettering 28 results. This reversal of image caused by movement of the original 24 and copy 26 in opposite directions is illustrated diagrammatically in FIG. 2 wherein the original 24 and copy 26 have been shown as being turned away from the image transfer member 12 only for purposes of clearer illustration. In FIG. 2, the letters A–E have been shown as being arranged on the original 24 so as to approach the face 20 of the member 12 at different time intervals for purposes of illustrating the effect of scanning by the member 12. In this respect, it can be seen that the letters D, E, F and G have been completely scanned by the member 12 and reproduced upon the copy 26 in true form while the letters A, B and C have, at this point, been only partially scanned and thus only partially reproduced substantially as illustrated.

It is pointed out that since the subject matter or lettering 28 on the original is transferred to the copy progressively as a succession of adjoining line-like image elements each of a size or thickness in accordance with the diameter of the fibers 14 of the member 12, the resultant resolution of the copy 28' thereof is dependent upon the size of fibers 14 used. That is, a member 12 formed of larger fibers 14 would produce copies of poorer definition than would a member formed of smaller fibers. Thus, the fiber size or overall thickness of the member 12 must be kept to a minimum, that is, within practical limits. In this respect, photographs, printed or written matter or the like can be reproduced successively and with good definition by forming the member 12 of fibers 14 which are approximately 2 to 3 thousandths of an inch in diameter. The fiber 14 sizes, however, may range from approximately 1 to 5 thousandths of an inch in diameter. All fiber sizes are given by way of example only.

While the above description relates to direct illumination of the subject matter or lettering 28 on the original 24 by means of the lamps 58, is is to be understood that indirect illumination of the subject matter on the original 24 may be accomplished with the device 10 by projecting light through the original 24 and thence onto the light-receiving face 20 of the member 12. This is accomplished by placing a lamp 58' (shown by dot-dash outline in FIG. 1) over the face 20 of the member 12 adjacent the outer or upwardly directed surface of the original 24. In such a case, the lamps 58 would not ordinarily be used and might be removed or simply not illuminated. As mentioned above, copying by projection of light through the original 24 can only be practiced when printed subject matter or the like exists on only one side of the original and when the original is transparent or sufficiently translucent to permit passage of light therethrough. When copying by direct illumination of the subject matter or lettering 28 on the surface 30 of the original 24 (with lamps 58) it is immaterial as to whether or not there is printed or other subject matter on the opposite side of the original 24 or whether the original is translucent or opaque.

Since some light-sensitive surfaces of copy material such as 26 require more or less exposure time than others, the rate of travel of the original and copy members 24 and 26 is controlled in accordance with the exposure time required by varying the speed at which the motor 42 operates. That is, if speed adjustment is required, the motor 42 would be selected to be of a conventional variable speed type or, alternatively, the pulley 52 might be replaced by a conventional variable speed pulley suitable for this purpose.

In FIG. 4, there is shown a modification of the image transfer member 12 wherein a similar member 12' is formed of square fibers 14' arranged in side-by-side connected together relation. Other than being differently shaped, the fibers 14' are identical in nature to the fibers 14.

In FIG. 5 an alternate construction for a similar image transfer member 12" is shown wherein a multiplicity of triangular fibers 14" are assembled together in side-by-side relation.

It is pointed out that fibers of any desired cross-sectional configuration may be used to form the image transfer member 12 of the invention. However, in all cases, the overall thickness of the resultant member 12 must be controlled to be of such size as to produce copies having acceptable definition. As mentioned above, a thickness of from 2 to 3 thousandths of an inch is generally considered to be appropriate.

While a preferred form of printing device having the original 24 and the copy 26 arranged to travel simultaneously in opposite directions has been shown in FIG. 1, it is pointed out that it is also possible, as by the modified device 110 of FIG. 6, to obtain a true copy of an original when the original and the copy are both arranged to simultaneously travel in the same direction. In FIG. 6, the original is indicated at 124 and the copy at 126 and while a substantially equivalent arrangement of motor, drive belts, pulleys, shafts and rollers has been shown therein, this arrangement, nevertheless, differs from that of FIG. 1 in two important respects.

Firstly, it will be noted, the power being supplied (in the direction indicated) by motor 142 and belts 144 and 146 to advance the copy 126 is being supplied to the shafts of rollers 134 which overlie the copy. Rollers 138 therebeneath merely act as pressure rollers. Accordingly, the copy 126 will travel longitudinally in the direction indicated by arrow 154. On the other hand, drive belts 148 and 150 for advancing the original 124 are connected to the shafts of rollers 136 underlying the original. Thus, it will be readily apparent the arrangement of parts that such original 124 will be advanced in the same longitudinal direction, as indicated by arrow 156. Rollers 140 overlying the original merely act as pressure rollers.

The second important difference in the modified construction of FIG. 6 resides in the fact that the optical means or member for transferring information or the like from the original 124 to the copy 126 is made to effect a reversal of image in such a manner as to enable the printing of a true image on copy 126 rather than a mirror image. If a fiber optic image transfer mmeber like that shown at 12 in FIG. 1 were used with the structural arrangement of FIG. 6, a mirror image on the copy would result. However, there is shown in FIGS. 6 and 7 a modified image-transfer member 112 which has its light-emitting face 122 in a reversed relation relative to its light-receiving face 120. Additionally, this member 112, like member 12, may be formed by a plurality of individual thin elongated light-conducting fibers 114 which are arranged and secured in side-by-side relation to each other at least adjacent their opposite ends. However, intermediate the opposite ends of this image-transfer member 112, a full half twist is provided therein; and this is such that, for example, the fiber which has one of its ends 114a at the extreme right side of this member and closely adjacent the original 120, as viewed in FIG. 7, will also have its opposite end 114aa at the extreme left of the member 112 and closely adjacent copy 126. Similarly, numerals 114b and 114bb indicate the opposite ends of the extreme fiber at the opposite side of the image-transfer member.

This twist in the member 112 is possible since the fibers thereof are relativley long and very thin and preferably unattached to each other at points between their opposite end portion so that the transfer member, as a whole, will have sufficient flexibility to allow the half twist. Thus, when image-reversing member 112 is used with a device arranged to advance both original and copy in the same direction, the combination will, in a manner much like that already explained relative to the modification of FIG. 1, effect a true image of the original on copy 126, and, of course, any of the fibers which can be used for forming member 12 can also be used in the formation of member 112.

From the foregoing, it can be seen that improved, simple and economical means and method have been provided for accomplishing all of the objects and advantages of the invention. However, it should be apparent that many changes in the details of construction, arrangement of parts and steps in the process may be made without departing from the spirit of the invention as expressed in the accompanying claims and the invention is not limited to the exact matters shown and described as only preferred matters have been given by way of illustration.

I claim:

1. An image-copying apparatus comprising means for supporting original and copy mediums in spaced relation from each other, an image transfer member extending between said mediums for conveying an image from the original to the copy, said member being formed of a multiplicity of long and thin continuous light-conducting fibers each having a core of light-conducting material of relatively high refractive index surrounded by a relatively thin cladding having a lower refractive index than said core, said apparatus being characterized in that the fibers of said image transfer member are arranged in the form of a continuous ribbon with lengths of the fibers adjacent corresponding opposite ends thereof disposed in mutually parallel substantially geometrically identical side-by-side relationship, the ribbon having opposite image-receiving and image-emitting end faces each of a length extending substantially the entire widths respectively of the original and copy mediums and of a thickness at said image-receiving face no greater than the minimum degree of resolution required of a copy to be produced whereby said opposite end faces will function to receive and emit line-like segmentary images of said original each of a size and shape corresponding to that of said faces, said ribbon being twisted as a unit intermediate said opposite end faces through an angle of substantially 180° to dispose said opposite end faces in a corresponding 180° angular relationship to each other and means for moving said original and copy mediums lengthwise across said faces in substantially the same direction to form a true copy of said original consisting of a continuous series of said line-like images.

2. The method of making a reproduction of subject matter on an original medium by a continuous optical copying process comprising forming at an image resolving station long and thin line-like images of segments of said subject matter each extending across the entire width thereof and having a thickness dimension no greater than the minimum degree of resolution required of said reproduction, said images each being comprised of a great number of individual image elements disposed in side-by-side relationship with no one dimension thereof being greater than said thickness dimension, transferring said images by reflection of respective image elements thereof individually onto a copy medium at an image-receiving station, causing said images to rotate in their entirety through an angle of substantially 180° during such transference thereof and moving said mediums at said stations both in the same direction across the thickness of said images.

References Cited
UNITED STATES PATENTS

| | | |
|---|---|---|
| 2,198,115 | 4/1940 | John. |
| 3,060,805 | 10/1962 | Brumley. |
| 3,060,806 | 10/1962 | Lewis et al. |
| 3,125,013 | 3/1964 | Herrick et al. _____ 95—75 |

FOREIGN PATENTS

| | | |
|---|---|---|
| 285,738 | | Great Britain. |

JULIA E. COINER, *Primary Examiner.*